(12) United States Patent
Pratt

(10) Patent No.: US 10,393,583 B2
(45) Date of Patent: Aug. 27, 2019

(54) CALIBRATION TARGET FOR HYPERSPECTRAL IMAGE SENSOR

(71) Applicant: Patricia D. Pratt, Redondo Beach, CA (US)

(72) Inventor: Patricia D. Pratt, Redondo Beach, CA (US)

(73) Assignee: NORTHROP GRUMMAN SYSTEMS CORPORATION, Falls Church, VA (US)

(*) Notice: Subject to any disclaimer, the term of this patent is extended or adjusted under 35 U.S.C. 154(b) by 206 days.

(21) Appl. No.: 15/232,630

(22) Filed: Aug. 9, 2016

(65) Prior Publication Data

US 2018/0045565 A1 Feb. 15, 2018

(51) Int. Cl.
*H04N 7/18* (2006.01)
*G01J 3/02* (2006.01)
*G01J 3/28* (2006.01)

(52) U.S. Cl.
CPC .............. *G01J 3/0297* (2013.01); *G01J 3/28* (2013.01); *G01J 3/2823* (2013.01); *G01J 2003/2866* (2013.01)

(58) Field of Classification Search
CPC .......... G01J 3/0297; G01J 3/28; G01J 3/2823; G01J 2003/2866
USPC ....... 250/252.1; 348/144; 362/554; 382/103; 422/82.05; 356/310
See application file for complete search history.

(56) References Cited

U.S. PATENT DOCUMENTS

| | | | |
|---|---|---|---|
| 5,036,435 A * | 7/1991 | Tokuda | G02B 6/001 362/554 |
| 7,013,172 B2 | 3/2006 | Mansfield et al. | |
| 7,369,229 B2 | 5/2008 | Bissett, III et al. | |
| 8,599,374 B1 * | 12/2013 | Comstock, II | G01J 3/04 356/310 |
| 8,767,210 B1 | 7/2014 | Lukashin et al. | |
| 9,118,881 B2 | 8/2015 | Guerreri et al. | |
| 2010/0032557 A1 * | 2/2010 | Schiller | G02B 5/1861 250/252.1 |
| 2010/0329512 A1 * | 12/2010 | Nam | G01N 21/25 382/103 |
| 2012/0292494 A1 * | 11/2012 | Silny | G01J 1/0414 250/252.1 |
| 2015/0044098 A1 * | 2/2015 | Smart | A61B 5/0013 422/82.05 |

FOREIGN PATENT DOCUMENTS

CN 103575395 A 2/2014

OTHER PUBLICATIONS

Rao, CR Nagaraja, et al. "Post-launch calibration of meteorological satellite sensors." *Advances in Space Research* 23.8 (1999): 1357-1365.

* cited by examiner

*Primary Examiner* — Jayanti K Patel
*Assistant Examiner* — Richard B Carter
(74) *Attorney, Agent, or Firm* — Tarolli, Sundheim, Covell & Tummino LLP

(57) ABSTRACT

A calibration target for a hyperspectral image sensor can include a panel with a predetermined length and width. The calibration target can also include a dispersive fabric overlaying a surface of the panel that refracts and disperses light illuminated from an illumination source to provide light on a plurality of different spectral bands corresponding to spectral bands detectable by the hyperspectral image sensor.

7 Claims, 4 Drawing Sheets

CALIBRATION TARGET FOR HYPERSPECTRAL IMAGE SENSOR

TECHNICAL FIELD

This disclosure relates to a calibration target for a hyperspectral image sensor.

BACKGROUND

Meteorological satellites operating in geostationary orbits around the Earth provide observations of the Earth's surface and clouds. Images in or near the visible spectral domain can be used for the weather forecast and for monitoring important climate variables such as the surface insolation, surface albedo, pollution, smog and cloud characteristics. In some examples, such meteorological satellites can employ hyperspectral imaging.

Hyperspectral imaging, like other spectral imaging, collects and processes information across the electromagnetic spectrum. The aim of hyperspectral imaging is to obtain the spectrum for each pixel in the image of a scene, with the purpose of finding objects, identifying materials, or detecting processes.

Calibrating imagers is a common pre-processing step for remote sensing analysts that need to extract data and create scientific products from images. Calibration attempts to compensate for radiometric errors from sensor defects, variations in scan angle, and system noise to produce an image that represents true spectral radiance at the sensor.

SUMMARY

One example relates to a calibration target for a hyperspectral image sensor that can include a panel with a predetermined length and width. The calibration target can also include a dispersive fabric overlaying a surface of the panel that refracts and disperses light illuminated from an illumination source to provide light on a plurality of different spectral bands corresponding to spectral bands detectable by the hyperspectral image sensor.

Another example relates to a calibration target for a hyperspectral image sensor that includes a plurality of panels arranged along a path for the calibration target. The calibration target can also include a plurality of sheets of dispersive fabric. Each of the plurality of sheets of dispersive fabric can overlay a corresponding one of the plurality of panels, and each of the plurality of sheets of dispersive fabric can refract and disperse light illuminated from an illumination source to provide light on a plurality of different spectral bands corresponding to spectral bands detectable by the hyperspectral image sensor.

Yet another example relates to a calibration target for a hyperspectral image sensor. The calibration target can include a plurality of sheets of dispersive fabric that each refract and disperse light illuminated from an illumination source to provide light on at least 100 different spectral bands corresponding to spectral bands detectable by the hyperspectral image sensor. The plurality of sheets of dispersive fabric can be arranged along a path for the calibration target.

DETAILED DESCRIPTION

Examples described herein relate to a calibration target for calibrating a hyperspectral image sensor operating on an aircraft or a satellite. The calibration target can be formed of a panel with a sheet of dispersive fabric overlying a surface of the panel. The sheet of dispersive fabric can be fabricated to function similar to a dispersive prism to refract and disperse light (e.g., from the sun) to provide a radiance of light over a plurality of different spectral bands. Aircraft and/or satellites can be configured to fly-over the calibration target such that pixels of the image sensor of the hyperspectral imaging device can simultaneously capture a sample of the plurality of different spectral bands. The samples captured of the different spectral bands can be used to calibrate the hyperspectral image sensor to compensate for errors caused, for example, by environmental conditions, atmospheric variables (e.g., airborne dust, water zone vapor, etc.) and/or atmospheric attenuations.

Figure 1:
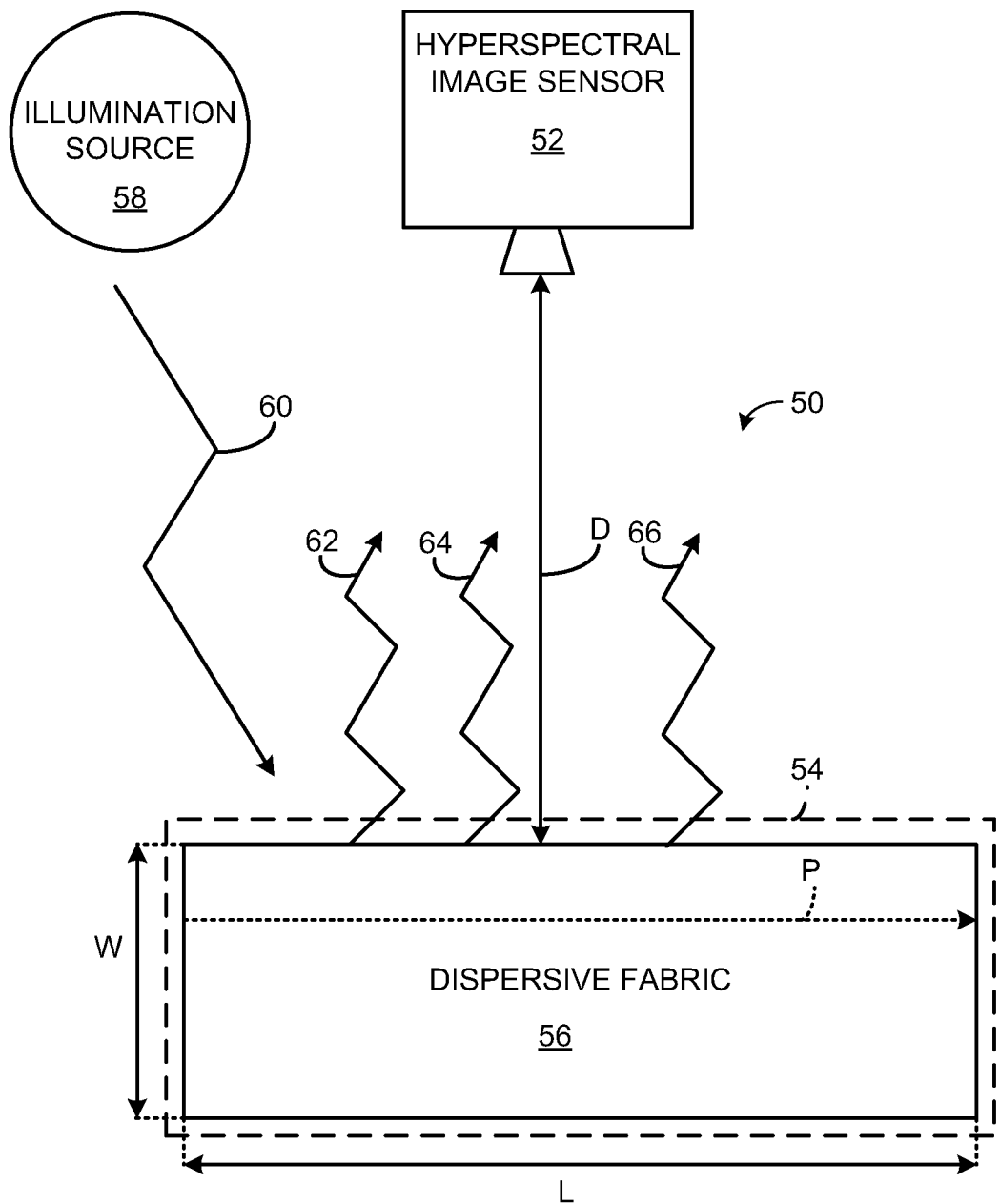
FIG. 1 illustrates an example of a system for calibrating a hyperspectral image sensor.

FIG. 1 illustrates an example of a system 50 for calibrating a hyperspectral image sensor 52. The hyperspectral image sensor 52 can be an airborne hyperspectral imager. For instance, the hyperspectral image sensor 52 can be deployed on an aircraft or a satellite. In other examples, the hyperspectral image sensor 52 can be implemented in a controlled environment, such as a laboratory. As used herein, the term "hyperspectral" denotes a plurality of continuous bands in the electromagnetic (EM) wave spectrum, wherein each of the bands have a bandwidth of about 15 nanometers (nm) or less (e.g., 3 nm to 15 nm). The hyperspectral image sensor 52 can be configured to receive EM waves in 100 bands or more (e.g., 300 bands or more).

The hyperspectral image sensor 52 can be configured to capture hyperspectral images of a given area. In examples where the hyperspectral image sensor 52 is airborne, the given area can be a specific geographic area of the Earth. In some examples, the specific geographic area can include land and/or water.

Due to environmental variables (e.g., change of temperature, vibrations, etc.), the hyperspectral image sensor 52 may need calibration on a periodic and/or as-needed (e.g., ad-hoc) basis. In such a situation, the hyperspectral image sensor 52 can be configured to capture an image of a calibration target 54. The calibration target 54 can have a predetermined size, color and functional characteristics that can be relied upon by the hyperspectral image sensor 52 to facilitate calibration. The calibration target 54 can also be referred to as a dispersive calibration target.

The calibration target 54 can be a panel or a plurality of panels (e.g., a frame) with a predetermined length (labeled and FIG. 1 as "L") and a predetermined width (labeled in FIG. 1 as "W"). The calibration target 54 can extend along a path (labeled in in FIG. 1 as 'P'). In some examples, the path of the calibration target 54 can be linear. In other examples, the path of the calibration target 54 can be non-linear.

The calibration target 54 can have a dispersive fabric 56 that can overlay the panel. The dispersive fabric 56 can also be referred to as hyperspectral dispersive fabric. The predetermined width can be about 1 meter to about 10 meters and the predetermined length can be about 1 meter to several kilometers (e.g. 10 kilometers). The calibration target 54 and the hyperspectral image sensor 52 can be separated a predetermined approximate distance of separation (labeled in FIG. 1 as "D"). The size of the calibration target 54 can be proportional to the predetermined approximate distance of separation. That is, the larger the predetermined approximate distance of separation, the larger the calibration target 54 may be.

The dispersive fabric 56 can be formed as a textile with interwoven threads of material. In some examples, the dispersive fabric 56 can be a fiber optic fabric. In such a situation, the dispersive fabric 56 may be an active component that is illuminated with a powered light source optically coupled to edges of the dispersive fabric 56. In other examples, the dispersive fabric 56 can be a passive component (e.g., not self-illuminated) and can be a textile formed from a natural or artificial material.

An illumination source 58 shines visible light rays upon the calibration target 54 indicated by an arrow 60. The illumination source 58 can be a natural illumination source (e.g., the sun) or an artificial illumination source (e.g., a light emitting diode (LED), a light bulb, etc.). The visible light rays are refracted and dispersed by the dispersive fabric 56 to provide light waves with a specific radiance. In particular, the light refracted by the dispersive fabric 56 has a spectrum of colors dispersed over a predetermined set of spectral bands. The refracted and dispersed rays are depicted in FIG. 1 as arrows 62, 64 and 66. In this manner, the dispersive fabric 56 operates as a dispersive prism. The predetermined set of spectral bands can correspond to the spectral bands detectable by the hyperspectral image sensor 52.

The calibration target 54 can be deployed in many different manners. For example, the calibration target 54 can be deployed on land, partially submerged in water or in a laboratory environment. The predetermined set of spectral bands can be determined, for example, based on the environment of application that the calibration target 54 is deployed. For instance, in situations where the calibration target is submerged in water (e.g., by about 4 centimeters to about 1 meter), the predetermined spectral bands of the dispersive fabric 56 may be selected to match a spectral band of phytoplankton in the water. Conversely, in situations where the calibration target is deployed on land, the predetermined spectral bands may be selected to match characteristics of the land and/or the atmosphere.

The hyperspectral image sensor 52 can capture/sample a portion of the light refracted by the dispersive fabric 56 that is spread throughout the spectral bands. Since the wavelengths and frequencies radiated from the dispersive fabric 56 are predetermined and can be programmed into the hyperspectral image sensor 52, the hyperspectral image sensor 52 can be calibrated. The calibration of the hyperspectral image sensor 52 can compensate for errors/drift caused by environmental conditions (e.g., temperature), atmospheric variables (e.g., airborne dust, water zone vapor, etc.) and/or atmospheric attenuations.

The dispersive fabric 56 can be sized and/or illuminated in a manner that the hyperspectral image sensor 52 can capture a measurable quantity of light of at least 7.9 photons per every 91 meters (about 300 feet) of the distance D between the hyperspectral image sensor 52 and the dispersive fabric 56 if the hyper spectral image sensor 52 is traveling at a high velocity (e.g., such as in a satellite moving at a rate of about 7000 m/s). In situations where the hyper spectral image sensor 52 is traveling slower, the hyperspectral image sensor 52 may be able to operate properly while capturing a higher number of photons per 91 meters of the distance D from the longer dwell time or lower altitude. Such illumination could be solar incident light (during the daytime) or generated at the dispersive fabric 56 itself (e.g., as an optical fabric) if solar light is unavailable or insufficient (e.g., a dusk, night time or dawn).

Figure 2:
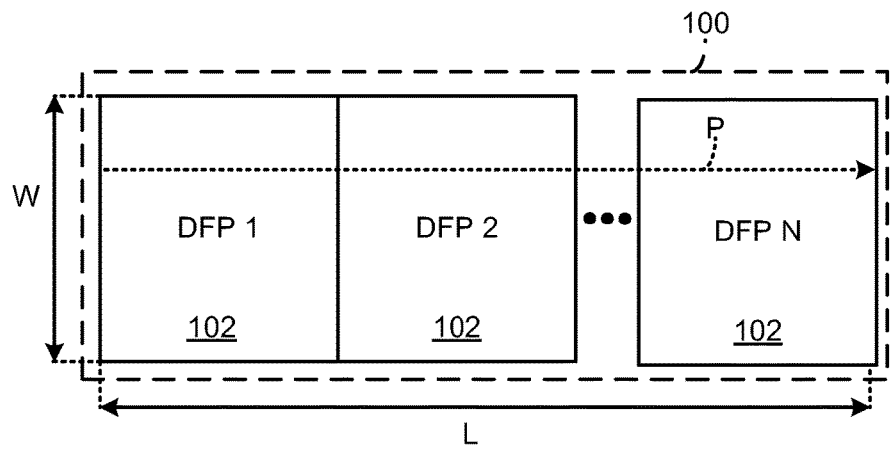
FIG. 2 illustrates an example of a calibration target for a hyperspectral image sensor.

FIG. 2 illustrates an example of a calibration target 100 that could be employed for example, to implement the calibration target 54 of FIG. 1. The calibration target 150 can be formed from N number of panels 102 with dispersive fabric overlaying a side of the panel, which panels can be referred to as dispersive fabric panels 102 (labeled as "DFP" in FIGS. 2-4), where N is an integer greater than or equal to one. The calibration target 100 can have a predetermined width (labeled in FIG. 2 as "W") and a predetermined length (labeled in FIG. 2 as "L"). Each of the N number of dispersive fabric panels 102 can form a portion of the total length and width of the calibration target 100. Moreover, in some examples, each of the N number of dispersive fabric panels can be substantially the same size. Alternatively, in other examples, some or (or all) of the N number of dispersive fabric panels 102 can have different sizes. The calibration target 100 can be a substantially linear path labeled in FIG. 2 as 'P' that extends across the dispersive fabric panels 102.

In operation, the dispersive fabric panels 102 refract and disperse light from an illumination source over a set of spectral bands (hyperspectral bands). The refracted light can be captured/sampled by a hyperspectral image sensor (e.g., the hyper spectral image sensor 52 of FIG. 1) to facilitate calibration.

Figure 3:
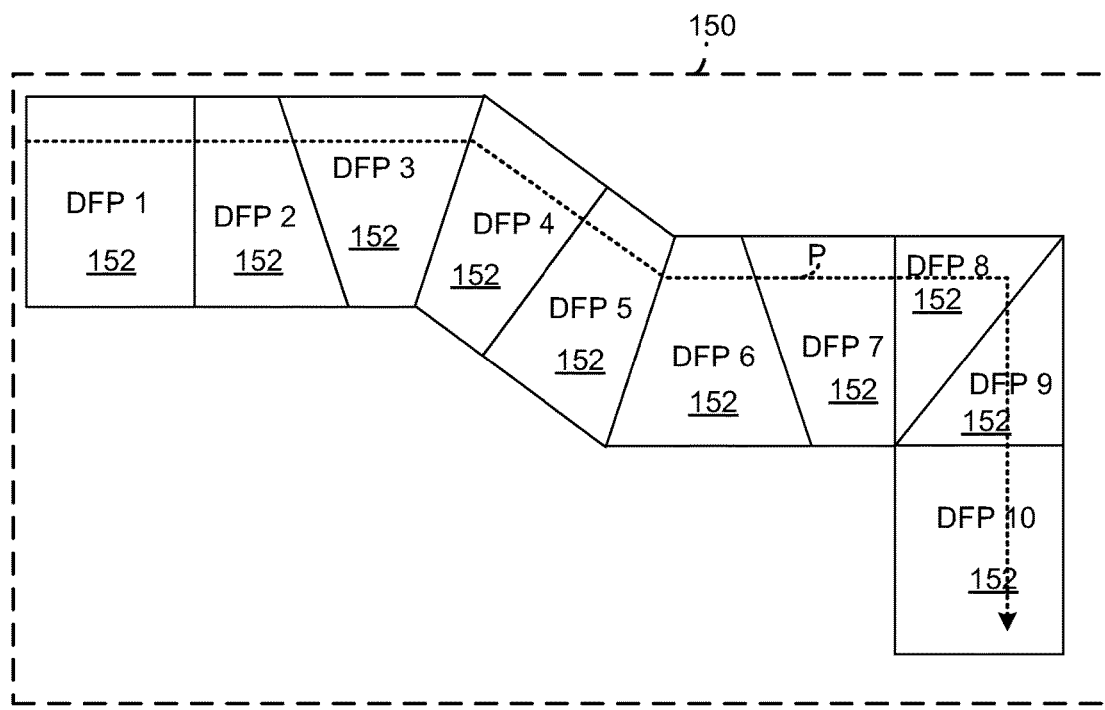
FIG. 3 illustrates another example of a calibration target for a hyperspectral image sensor.

FIG. 3 illustrates another example of a calibration target 150 that could be employed, for example to implement the calibration target 54 of FIG. 1. The calibration target 150 is illustrated in FIG. 3 as being formed with ten (10) dispersive fabric panels 152 (labeled in FIG. 3 as DFP 1-10), but in other examples, more or less dispersive fabric panels 152 can be employed. The calibration target 150 can have a path labeled in FIG. 3 as 'P'.

As illustrated in FIG. 3, the dispersive fabric panels 2-7 have a trapezoidal shape. Inclusion of the dispersive fabric panels 152 with the trapezoidal shape allows the path 'P' of the calibration target 150 to be non-linear. Similarly, dispersive fabric panels 8 and 9 of the calibration target 150 have a triangular shape to allow for a right angle in the path of the calibration target 150. In this manner, the shape of the calibration target 150 can be configured based on environmental conditions. For instance, such a non-linear path of the calibration target 150 allows for traversal of natural obstacles (e.g., trees, rocks, etc.) or human made obstacles (e.g., roads, buildings, etc.) that may exist in situations where the calibration target 150 is long (e.g., 10 or more meters in length).

The operation of the calibration target 150 is similar to the operation of the calibration target 100 of FIG. 2. That is, the dispersive fabric panels 102 refract and disperse light from an illumination source to provide radiated light that is dispersed over a set of spectral bands. The refracted light can be captured/sampled by a hyperspectral image sensor (e.g., the hyper spectral image sensor 52 of FIG. 1) to facilitate calibration.

Figure 4:
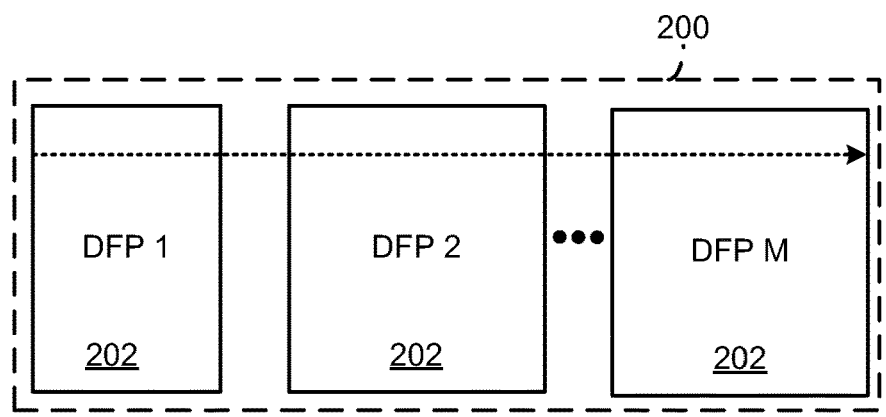
FIG. 4 illustrates yet another example of a calibration target for a hyperspectral image sensor.

FIG. 4 illustrates another example of a calibration target 200 that could be employed, for example to implement the calibration target 54 of FIG. 1. The calibration target 200 is illustrated in FIG. 4 as being formed with M number of dispersive fabric panels 202, where M is an integer greater than one. The calibration target 200 includes a path (labeled in FIG. 4 as 'P'). Although the path of the calibration target 200 is illustrated as being substantially linear, the path of the calibration target 200 could alternatively be non-linear.

In FIG. 4, the first and second dispersive fabric panels 202 (dispersive fabric panels 1-2) are spaced apart from each other. It is noted that the path of the calibration target 200 extends across the spaces in between the dispersive fabric panels 202. Additionally, in some examples, some (or all) of the dispersive fabric panels 2-M may be spaced apart from each other. In this manner, the calibration target 200 can be deployed where certain environmental features (e.g., elevation change, body of water, etc.) may prevent a continuous stream of adjacent dispersive fabric panels.

Figure 5:
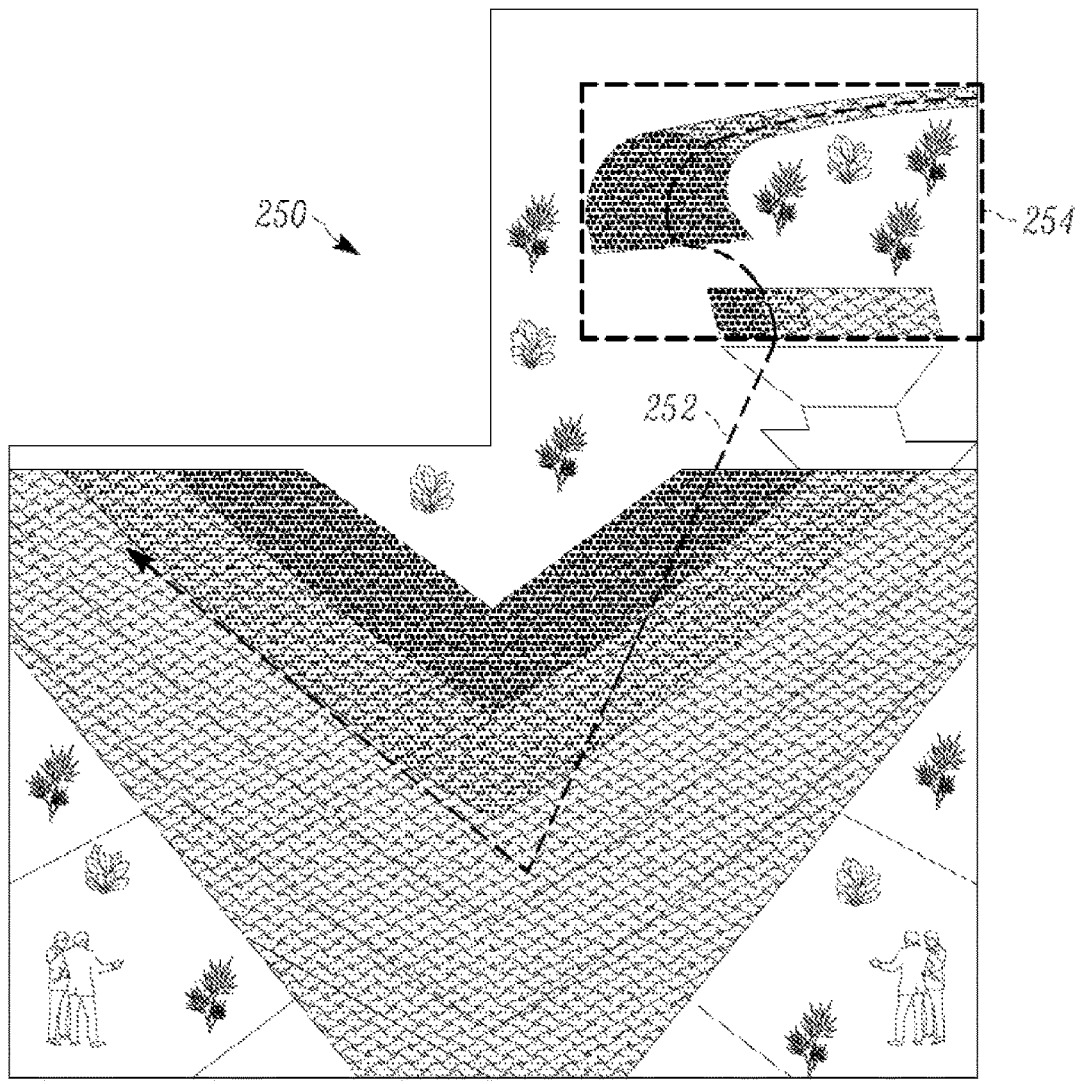
FIG. 5 illustrates a picture of an example of a deployed calibration target for a hyperspectral image sensor.

FIG. 5 is a picture 250 depicting an example deployment of a calibration target. As illustrated, in the picture 250, the calibration target includes a plurality of dispersive fabric panels, wherein some have a rectangular shape, some have a trapezoidal shape and some have a triangular shape. Moreover, as is illustrated, some of the dispersive fabric panels are spaced apart from each other, such that the calibration target is discontinuous. As is illustrated in the picture 250, a portion 254 of the calibration target extends substantially parallel to a curved road.

The picture 250 includes a dotted line representing a path 252 of the calibration target. In the picture 250, the path 252 is non-linear and extends between spaced apart panels.

Figure 6:
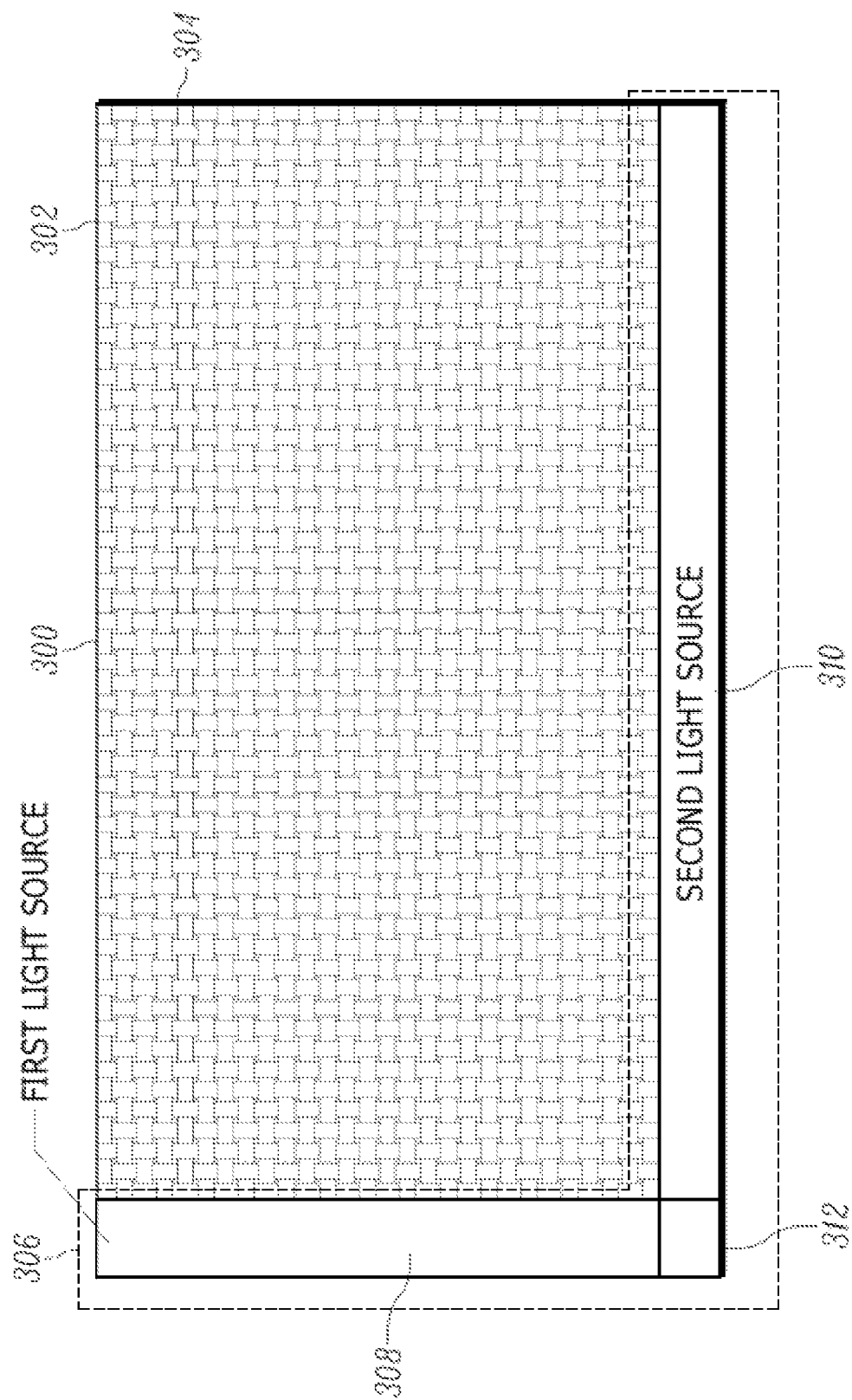
FIG. 6 illustrates an example of a dispersive fabric for a calibration target.

FIG. 6 illustrates a detailed view of an example of a sheet of dispersive fabric 300 that could be employed, for example, to implement the dispersive fabric 56 of FIG. 1. The dispersive fabric 300 illustrated in FIG. 6 is implemented as a fiber optic fabric. Thus, the dispersive fabric 300 is formed from a plurality of interwoven optical fibers 302 and 304. The optical fibers 302 can extend in a first direction and the optical fibers 304 can extend in a second direction, normal (e.g., 90 degrees) from the first direction. The dispersive fabric 300 can also have a lighting system 306 is in optical communication with the dispersive fabric 300 to illuminate the dispersive fabric 300. The lighting system 306 can include a first light source 308 and a second light source 310. The first light source 308 can inject light in to the optical fibers 302 that extend in the first direction. The second light source 310 can inject light into the optical fibers 304 that extend in the second direction.

The lighting system 306 can include a controller 312 that controls the output of the first light source 308 and the second light source 310. The controller 312 can be implemented, for example as a microcontroller, an application specific integrated circuit chip (ASIC) or a microprocessor that executes machine readable instructions stored on a non-transitory machine readable medium (e.g., random access memory, volatile or non-volatile). In particular, the controller 312 can change an output color of the optical fibers 302 and the optical fibers 304. Moreover, by synchronizing the change in output colors, additional colors can be output by the dispersive fabric 300. Such a change in output colors changes the refraction properties of the dispersive fabric 300 so that the dispersive fabric 300 can be employed to facilitate calibration for a plurality of different hyperspectral image sensors that employ a plurality of different spectral bands.

It is to be understood that in other examples, the dispersive fabric 300 can be a passive material that does not require power from an external lighting source (e.g., implemented without the lighting system 306). That is, in some examples, rather that implementing the dispersive fabric 300 as a fiber optic fabric, the dispersive fabric 300 can be a textile formed with natural (or artificial) fabric materials, such as cotton, silk, linen, polyester, etc.

What have been described above are examples. It is, of course, not possible to describe every conceivable combination of components or methodologies, but one of ordinary skill in the art will recognize that many further combinations and permutations are possible. Accordingly, the disclosure is intended to embrace all such alterations, modifications, and variations that fall within the scope of this application, including the appended claims. As used herein, the term "includes" means includes but not limited to, the term "including" means including but not limited to. The term "based on" means based at least in part on. Additionally, where the disclosure or claims recite "a," "an," "a first," or "another" element, or the equivalent thereof, it should be interpreted to include one or more than one such element, neither requiring nor excluding two or more such elements.

What is claimed is:

1. A calibration target for a hyperspectral image sensor comprising:
   a plurality of panels arranged along a non-linear path for the calibration target; and
   a plurality of sheets of dispersive fabric, wherein each of the plurality of sheets of dispersive fabric overlays a corresponding one of the plurality of panels to radiate a different spectral band corresponding to spectral bands detectable by the hyperspectral image sensor, and each of the plurality of sheets of dispersive fabric is a dispersive prism that refracts and disperses light illuminated from a natural illumination source to provide light on a plurality of different spectral bands corresponding to spectral bands detectable by the hyperspectral image sensor, wherein the plurality of sheets of dispersive fabric are a size that is detectable by the hyperspectral image sensor implemented on a satellite.

2. The calibration target of claim 1, wherein at least two of the plurality of panels has a substantially trapezoidal shape.

3. The calibration target of claim 1, wherein at least two of the plurality of panels has a triangular shape to form a right angle.

4. The calibration target of claim 1, wherein at least two consecutive panels of the plurality of panels are spaced apart from each other.

5. The calibration target of claim 1, wherein the path is at least one kilometer long.

6. The calibration target of claim 1, wherein each of the plurality of sheets dispersive fabrics is formed from a fiber optic fabric.

7. A calibration target for a hyperspectral image sensor comprising:
   a plurality of sheets of dispersive fabric that each refract and disperse light illuminated from a natural illumination source to provide light on at least 100 different spectral bands corresponding to spectral bands detectable by the hyperspectral image sensor; wherein each of the plurality of sheets of dispersive fabric overlays a corresponding one of the plurality of panels to radiate a different spectral band corresponding to spectral bands detectable by the hyperspectral image sensor, and each of the plurality of sheets of dispersive fabric is a dispersive prism;

wherein the plurality of sheets of dispersive fabric are arranged along a non-linear path for the calibration target, wherein the plurality of sheets of dispersive fabric are a size that is detectable by the hyperspectral image sensor implemented on a satellite.

\* \* \* \* \*